United States Patent
Das et al.

(10) Patent No.: US 7,840,104 B2
(45) Date of Patent: Nov. 23, 2010

(54) ULTRA-WIDE BAND AWG MULTIPLEXER

(75) Inventors: Saurav Das, Stanford, CA (US); Boris Grek, Hayward, CA (US); Wenhua Lin, Fremont, CA (US)

(73) Assignee: Enablence USA Components, Inc., Fremont, CA (US)

( * ) Notice: Subject to any disclaimer, the term of this patent is extended or adjusted under 35 U.S.C. 154(b) by 0 days.

(21) Appl. No.: 11/827,855

(22) Filed: Jul. 13, 2007

(65) Prior Publication Data

US 2009/0016679 A1    Jan. 15, 2009

(51) Int. Cl.
*G02B 6/34*    (2006.01)
(52) U.S. Cl. .............................. 385/37; 385/24; 385/27; 385/43; 385/15
(58) Field of Classification Search ..................... 385/37
See application file for complete search history.

(56) References Cited

U.S. PATENT DOCUMENTS

| | | | | |
|---|---|---|---|---|
| 5,862,279 A * | 1/1999 | Amersfoort et al. | ........... | 385/40 |
| 6,563,988 B2 * | 5/2003 | McGreer | ..................... | 385/43 |
| 6,714,704 B2 * | 3/2004 | Lin et al. | ...................... | 385/37 |
| 6,728,442 B2 * | 4/2004 | Missey et al. | ................. | 385/37 |
| 6,768,842 B2 * | 7/2004 | Bulthuis et al. | ............... | 385/37 |
| 6,882,778 B2 * | 4/2005 | Fondeur et al. | ............... | 385/37 |
| 7,302,138 B2 * | 11/2007 | Lu | ............................... | 385/37 |
| 2002/0159703 A1 | 10/2002 | McGreer | | |

FOREIGN PATENT DOCUMENTS

| | | |
|---|---|---|
| EP | 1059545 A1 | 12/2000 |
| JP | 09171112 | 6/1997 |
| JP | 2002090561 A | 3/2002 |
| WO | 0248761 A2 | 6/2002 |

OTHER PUBLICATIONS

EP Search Report corresponding to EP 08160039.7-1234, Oct. 15, 2008, 6 pages.

* cited by examiner

*Primary Examiner*—Sarah Hahm
(74) *Attorney, Agent, or Firm*—Innovation Counsel LLP

(57) ABSTRACT

A multiplexing AWG device capable of producing an ultra-wideband, low ripple, flat-top signal is presented. The AWG device includes an AWG unit and a two-section waveguide coupled to the AWG unit. The two-section waveguide has a first section and a second section. The first section produces a signal having a double-peak field profile and has a first input end and a first output end. The second section reduces the phase variation of the signal having the double-peak field profile exiting the first section. The second section has a second input end that is coupled to the first output end. For example, the first section may be a parabolic tapered waveguide and the second section may be a rectangular waveguide.

18 Claims, 10 Drawing Sheets

Double Peak Field     Gaussian Field     Flat-top Field

ULTRA-WIDE BAND AWG MULTIPLEXER

BACKGROUND

1. Field of Invention

This invention relates generally to optical communications and in particular to arrayed waveguide grating (AWG) devices.

2. Relevant Technology

Arrayed Waveguide Grating (AWG) devices have been commercially successful in the optical communications industry. Tens of thousands of AWGs, made with Silica-on-Silicon planar waveguide integrated optics technology, have been deployed in today's communication networks. Their main application is in dense wavelength division multiplexing (DWDM) systems where multiple communication channels (wavelengths) are combined (multiplexed) and transmitted on a single fiber over large distances and separated (de-multiplexed) at the receiving end to recover the individual signals. The process of multiplexing and de-multiplexing wavelengths is done via the AWGs. Although other technologies exist for performing the same operation as the AWGs, AWGs are the most prevalent due to their superior performance, scalability and reliability.

Figure 1:
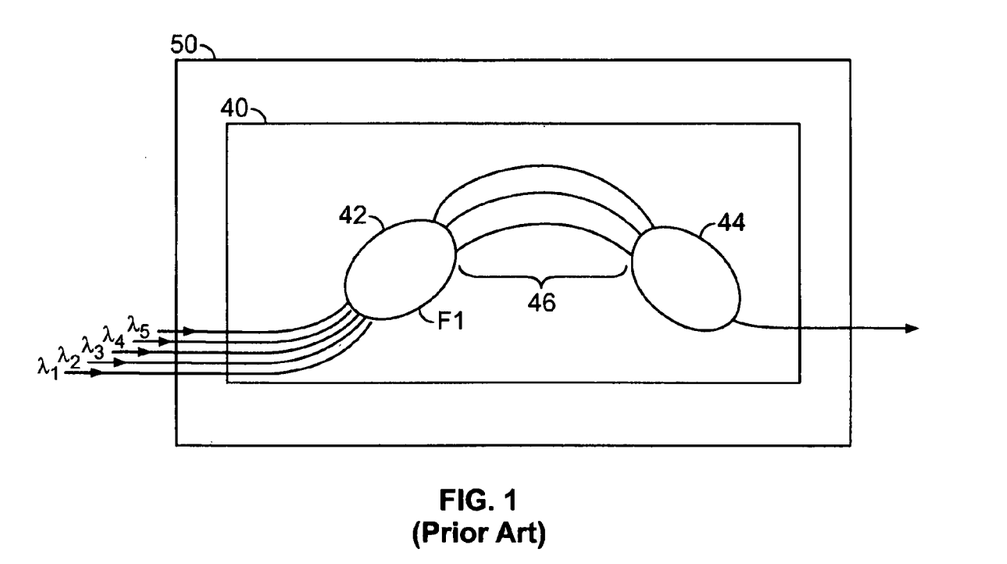
FIG. 1 is a schematic illustration of a conventional multiplexer (MUX) device having an AWG unit.

FIG. 1 is a schematic illustration of a conventional multiplexer (MUX) device 50 having an AWG unit 40. An AWG unit, which is currently available in the form of a monolithic chip, is an integrated optics planar waveguide structure that acts like a bulk diffraction grating. The construction and operation of AWG units are well known in the art. The AWG unit 40 has an input free propagation region (FPR) 42 and an output FPR 44 connected by an arrayed waveguide grating region 46. The arrayed waveguide grating region 46 includes channel waveguides of varying lengths. The waveguides usually vary in length by increments of $\Delta L$ such that, if there were seven waveguides, their lengths would be $\chi+3\Delta L$, $\chi+2\Delta L$, $\chi+\Delta L$, $\chi$, $\chi-\Delta L$, $\chi-2\Delta L$, and $\chi-3\Delta L$. Different wavelengths traveling through the array experience different amounts of time delay. The interference and diffraction caused by the different amounts of delay in each waveguide causes the radiation components having different wavelengths to emerge at different angles from the output end of the array waveguide grating region 46.

As shown, separate signal wavelengths (shown as $\lambda 1$, $\lambda 2$, $\lambda 3$, $\lambda 4$ and $\lambda 5$ in FIG. 1) enter the AWG device 40 through multiple input waveguides, pass through the arrayed waveguide grating region 46, and exit the multiplexer device 50 as a multiplexed signal. The input waveguides connect with the input FPR 42 at input face F1. The passband shape for a typical MUX device is wide-band Gaussian.

Although AWGs can perform both multiplexing and demultiplexing operations, the requirements for the two operations are usually quite different. More specifically, the demultiplexing operation has narrow spectral passband width requirements and tight adjacent channel crosstalk requirements, while the multiplexing operation has wide passband width requirements and no crosstalk requirement. The wavelength channels that are combined or separated usually conform to the ITU (International Telecommunications Union) grid—i.e., their frequencies are separated by a fixed spacing. For example, the wavelength channel frequencies may be 50 GHz, 100 GHz, and so on.

Figure 2:
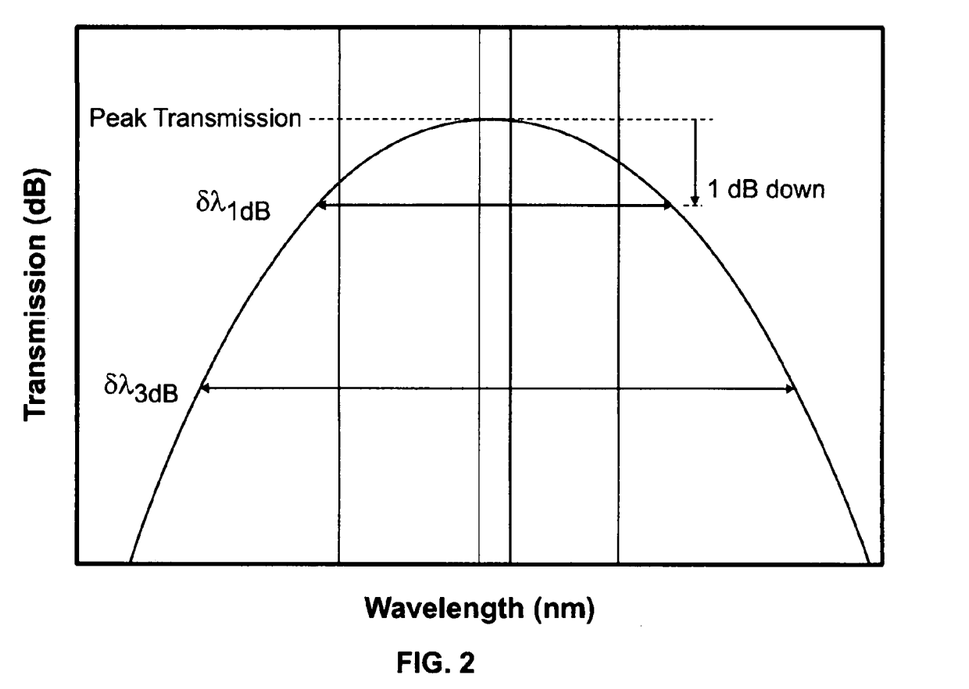
FIG. 2 shows the passband shape and the peak transmission of a waveguide channel.

FIG. 2 shows the passband shape and the peak transmission of a waveguide channel. Typically, the spectral passband is defined at 0.5 dB, 1.0 dB and 3.0 dB below the peak transmission value. FIG. 2 shows the "1-dB passband width" and the "3-dB passband width," which are the widths of the passband (in nm) at 1 dB and 3 dB below the peak transmission, respectively.

Table 1 below compares the passband widths (in nanometers) for different AWGs that are designed to handle both multiplexing and demultiplexing operations. These passband widths correspond to an AWG designed for a channel separation of 50 GHz (or roughly 0.4 nm).

TABLE 1

Comparison of spectral passband widths for different applications

| Passband Shape | AWG Function | 0.5 dB Passband Width (nm) | 1.0 dB Passband Width (nm) | 3.0 dB Passband Width (nm) |
| --- | --- | --- | --- | --- |
| Gaussian | Demultiplexer | 0.05 | 0.1 | 0.2 |
| Flat-top | Demultiplexer | 0.15 | 0.2 | 0.3 |
| Gaussian | Multiplexer | 0.075 | 0.15 | 0.3 |
| Flat-top | Multiplexer | 0.15 | 0.2 | 0.3 |
| Ultra wide Flat-top | Multiplexer | 0.4 | 0.5 | 0.6 |

Figure 3A:
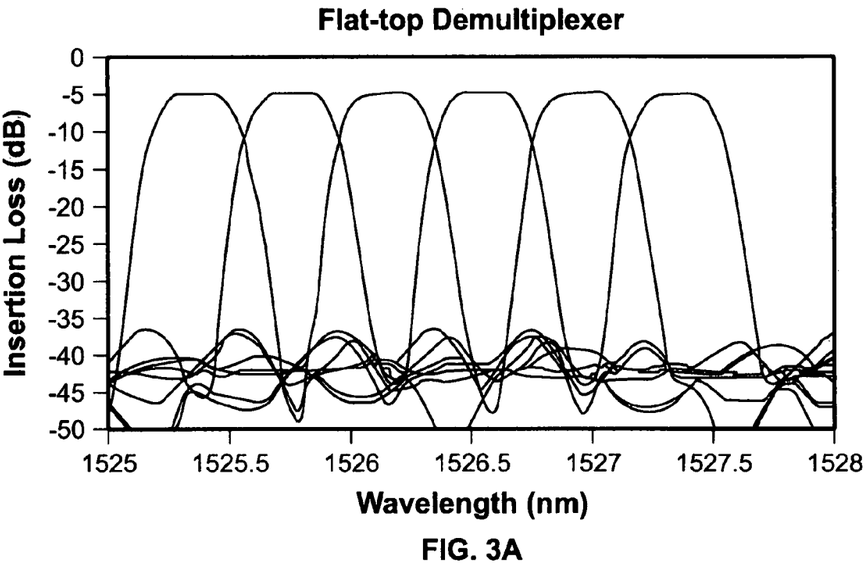
FIGS. 3A and 3B show spectral passband shapes of a flat top demultiplexing channel and an ultra-wideband flat-top multiplexing channel FIG. 4 pictorially depicts a "ripple."
Figure 3B:
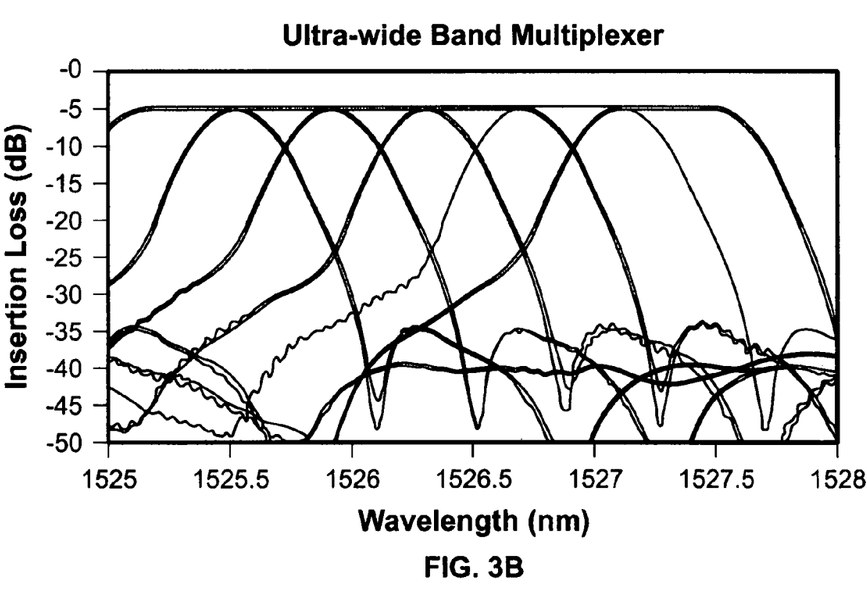

As shown in Table 1, there are different passband shapes and a range of passband widths that can be achieved. As DWDM systems move toward narrower channel spacing and higher modulation rate, the passband of multiplexer filters needs to be much wider than conventional flat-top filters. Hence, the ultra wide flat-top passband is becoming more desirable. FIGS. 3A and 3B show the spectral passband shapes of a flat top demultiplexing channel (second row in Table 1) and an ultra-wideband flat-top multiplexing channel (last row in Table 1). Although both passbands are flat-top spectral passbands, the former is narrower and has better crosstalk (i.e., sharper edges) than the latter. The passband shape of the ultra-wideband flat-top multiplexing channel is wide enough such that even the 0.5-dB down passband width is as wide as the channel spacing (here 0.4 nm).

Figure 4:
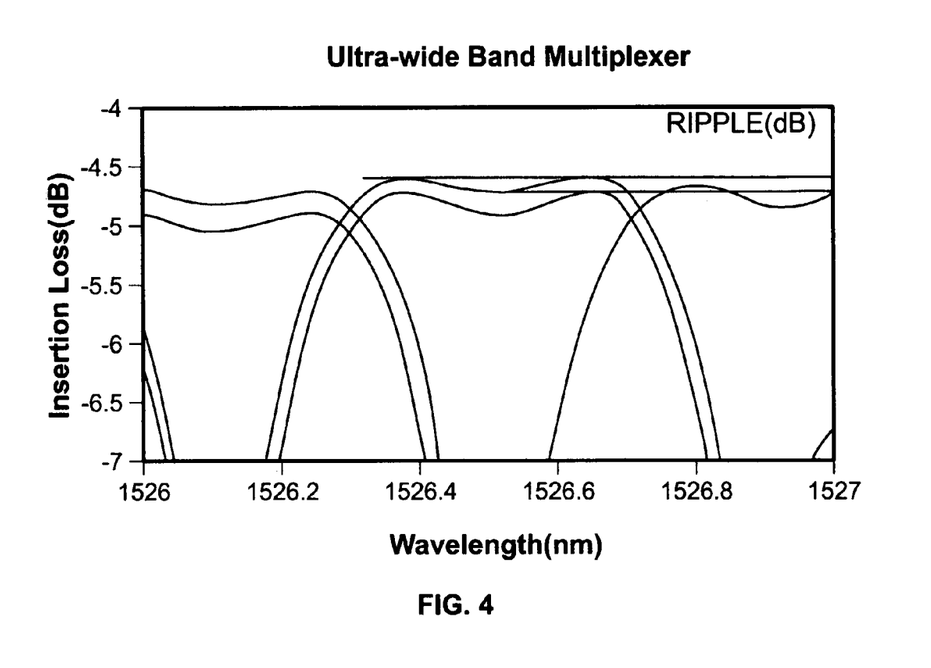

In addition to the passband width, another characteristic of interest is the ripple, which is pictorially depicted in FIG. 4. "Ripple" refers to the flatness at the top of a spectral passband, and there is usually a limit set on the acceptable depth of a ripple (e.g., less than 3 dB).

A method for designing an ultra-wideband, low ripple, flat-top, multiplexing AWG device is desired to be able to accommodate system demands for narrower channel spacing and higher modulation rate.

SUMMARY

In one aspect, the invention is an arrayed waveguide grating (AWG) multiplexer that includes an AWG unit and a two-section waveguide coupled to the AWG unit. The AWG unit has an arrayed waveguide region. The two-section waveguide has a first section that produces a signal having a double-peak field profile and has a second section that reduces the phase variation of the signal having the double-peak profile exiting the first section. The first section has a first input end and a first output end, and the second section has a second input end that is coupled to the first output end.

In another aspect, the invention is a method of producing an ultra-wide flat-top passband shaped signal. The method entails passing an input signal through an AWG unit, converting the input signal to a signal with a double-peak field profile, and changing the phase variation of the signal with the double-peak field profile to generate a flat-top field profile.

In yet another aspect, the invention is a method of producing an ultra-wide flat-top passband shaped signal that entails passing a plurality of input signals through an AWG unit, separately converting each of the input signals to a double-peak signal, and separately changing a phase variation of each double-peak signal to generate a flat-top field profile.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE EMBODIMENT(S)

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

It will be understood that when an element or layer is referred to as being "on" or "coupled to" another element or layer, it can be directly on or coupled to the other element or layer or intervening elements or layers may be present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

As used herein, the singular forms "a", "an" and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

Figure 5A:
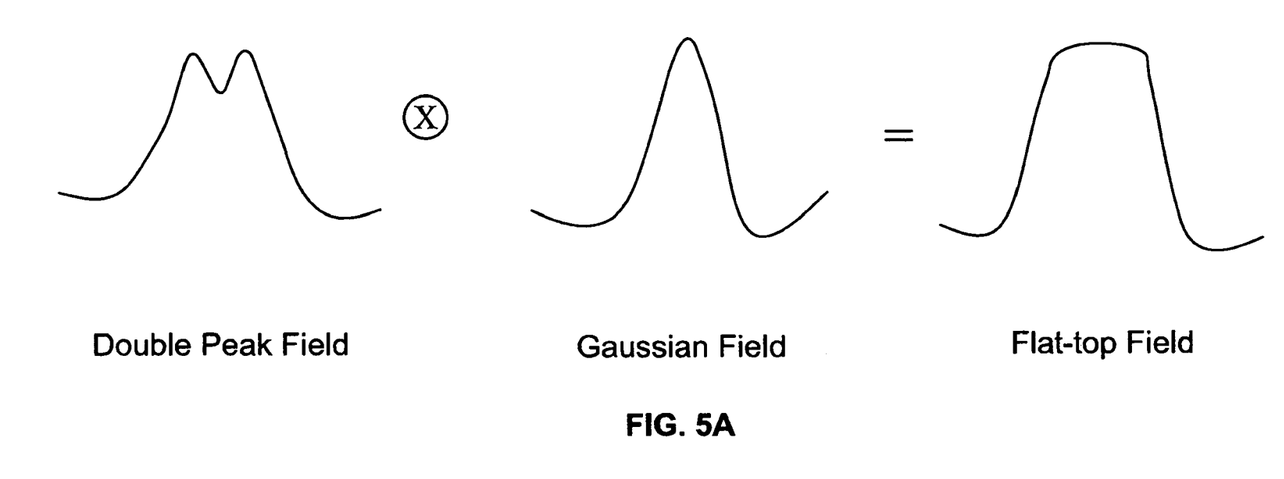
FIG. 5A pictorially depicts the convolution of a double-peak passband and a Gaussian passband to produce a flat-top passband.

FIG. 5A pictorially depicts one of the methods that involve the use of a double-peaked input optical field. In this method, a double-peaked input optical field is convolved with a Gaussian optical waveguide mode field to produce a substantially flat-top output spectral passband shape. The result of this convolution depends, among other things, on the proper design of the AWG unit 40. The AWG unit 40 reproduces the double-peaked input field to the output interface as an image and sweeps this image across the output waveguides as the wavelength changes with the designed linear dispersion (microns/nm). The spacing between the input waveguides is an important characteristic in the resulting spectral passband shape.

Figure 5B:
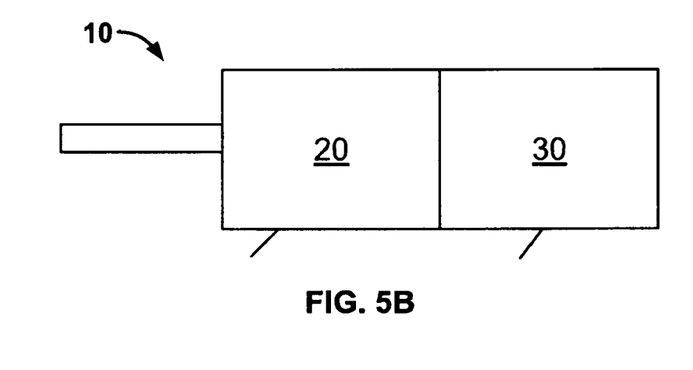
FIG. 5B shows the structure of a two-section waveguide that may be used with the AWG multiplexer in accordance with the invention.

FIG. 5B shows the structure of a two-section waveguide 10 of the AWG multiplexer 50 in accordance with the invention. As shown, the two-section waveguide 10 has a first section 20 and a second section 30 coupled to each other. The first section 20 may be a parabolic taper, line taper, sin/cos or exponential function-shaped structure, or a Y-branch structure (shown below in FIGS. 6A, 6B, 6C, and 6D). The width of the ultra-wide passband that ultimately results from using the two-section waveguide 10 is determined by the width of the output end of the first section 20.

Figure 7A:
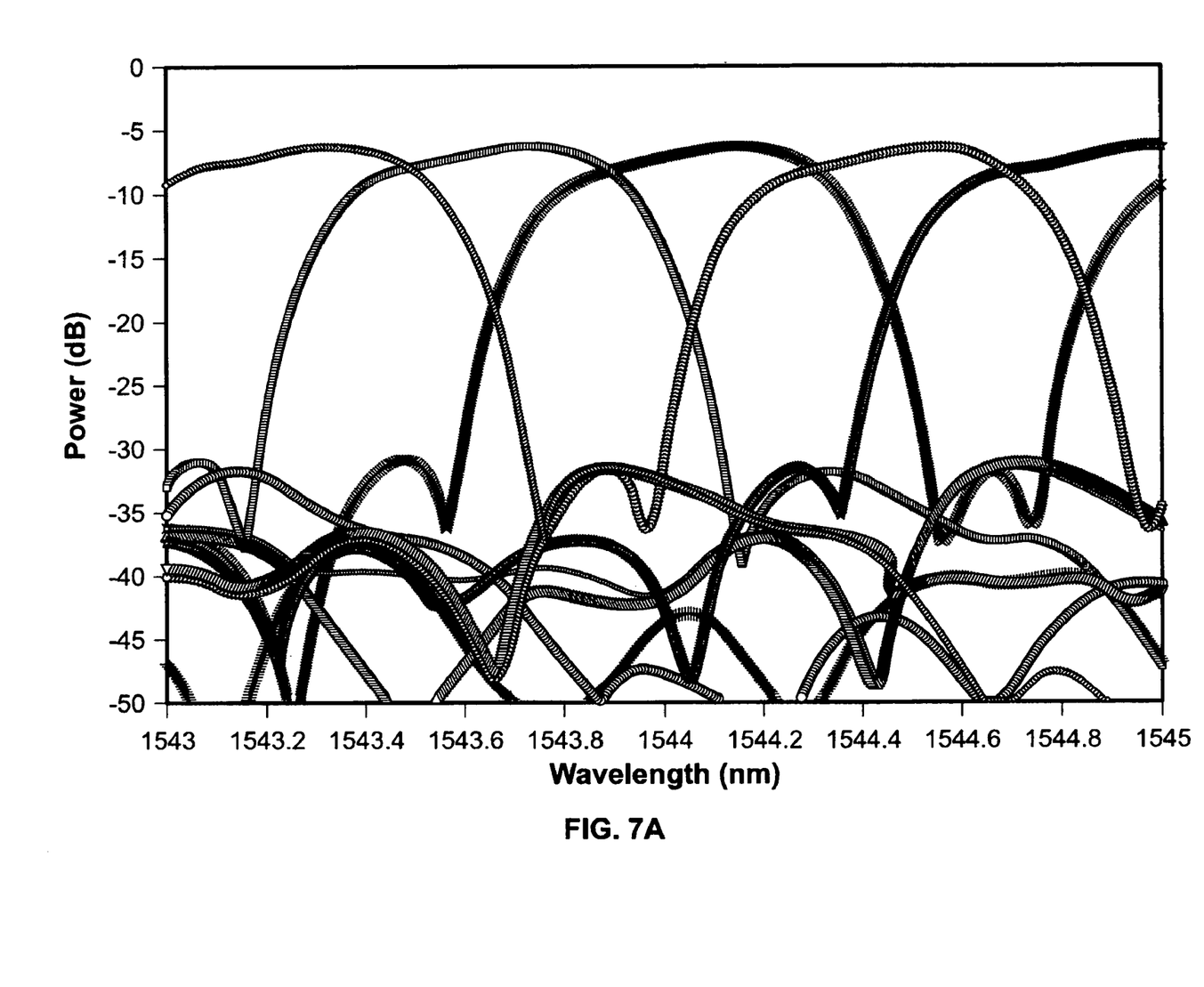
FIG. 7A shows the spectral shape of the passband exiting the first section of an input waveguide in accordance with the invention.
Figure 7B:
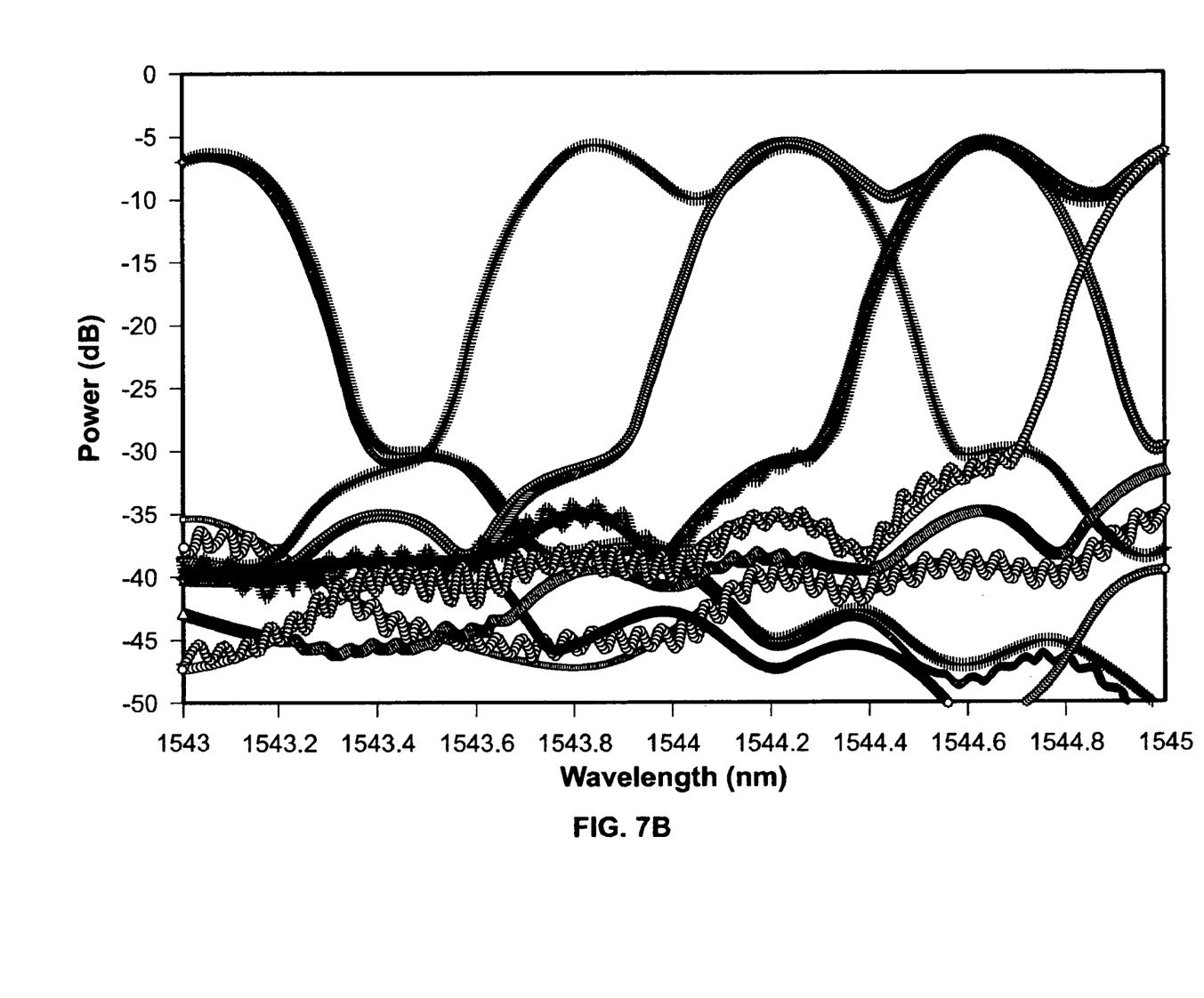
FIG. 7B shows the spectral shape of the passband exiting the second section of an input waveguide in accordance with the invention.

When only the first section 20 is used to make the AWG multiplexer device 50, significant passband tilting occurs in the resultant signal. FIG. 7A shows the spectral shape of the passband exiting the multiplexer device 50 where only the first section 20 is used without the second section 30. In the particular example used to generate FIG. 7A, the length of the first section 20 is 300 μm. As shown, there is a tilt of several dB in the passband shape. Adding the second section 30 reduces this tilting. FIG. 7B shows the spectral shape of the passband exiting the multiplexer 50 employing both sections of the two-section waveguide 10, and shows dramatic reduction in tilting. In FIG. 7B, the length of the first and the second sections 20, 30 are 300 μm each.

Figure 6A:
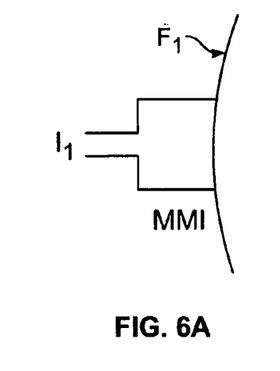
FIGS. 6A, 6B, 6C, and 6D show various types of tapered input waveguide that may be used to generate a wide passband shape.
Figure 6B:
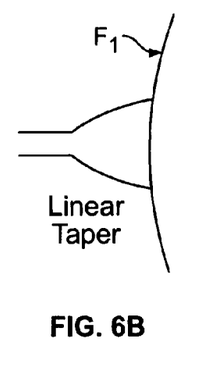

FIGS. 6A through 6D show various types of tapered waveguides that may be used in the first section 20. FIGS. 6A and 6B show a Multimode Interferometer (MMI) waveguide structure and a linear tapered waveguide structure that produce a double-peak passband shape.

Figure 6C:
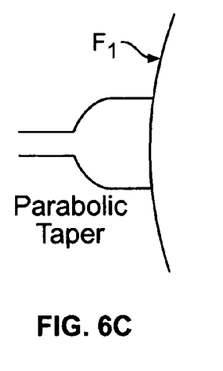

FIG. 6C shows a parabolic waveguide horn that may be used to produce the double-peak field profile. When an input waveguide that is single-mode in operation is allowed to expand rapidly (non-adiabtically) in a wider parabolic region, the expansion causes higher order modes (allowed in the wider region) to get excited along with the fundamental mode. These modes then interact to produce the double-peak field shape at a certain distance along the length of the parabolic waveguide.

The non-adiabatically expanded parabolic waveguide gives the required width without too large a dip between the two peaks of the input field. However, a design with a parabolic waveguide has its problems too when applied to the ultra-wide AWG case. Essentially, the phase front of the input field is not parallel to the end facet of the parabolic waveguide in a non-adiabatically expanded parabolic waveguide. As a result, the phase of the resultant double-peaked input field varies significantly over the width of the field.

Figure 6D:
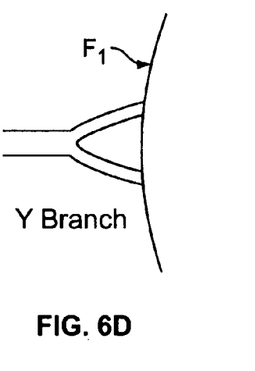

FIG. 6D shows another way to produce the double peak, which is to use a waveguide splitter at the input interface. Often, the split arms at the input interface are not separated as much as they would be if the purpose was to completely split the input field into two. This partial splitting results in a double-peaked input field.

The structures in FIGS. 6A through 6D may be useful when designing a flat-top multiplexer with wide passband spectral widths as shown above in Table 1. However, there are problems that arise when using these methods in designing an ultra-wide spectral passband multiplexer. For example, the width of the passband depends on the separation of the double peaks, which is controlled by the width of the output end of the tapered waveguide. Thus, one may try sizing the tapered waveguide to produce the desired passband width. However, the wider the separation distance between the two peaks, the greater the dip is likely to be between the two peaks, possibly exceeding the acceptable depth range of the dip. There will also be a large phase variation across the width of the input field.

A consequence of the large phase variation across the width of the input field is that upon convolution (via sweeping the input wavelength) with the output waveguide mode field, the resultant output spectral passband shape shows considerable tilt. The tilt in the passband shape is a result of good mode matching with the output wavguide mode field for some wavelengths and poor matching for other wavelengths, as they sweep across the output waveguide. The asymmetry has a direct correlation with the phase variation.

The invention solves this tilting problem by using the two-section waveguide 10. In the invention, the tilting of the spectral passband shape is avoided by making the phase of the input field as flat as possible. This is accomplished via the addition of the straight second section 30 following the end of the first section 20. The straight waveguide has a width that is substantially equal to the width of the output facet of the parabolic waveguide and a length which has to be carefully selected such that the phase variation is minimized.

Figure 8:
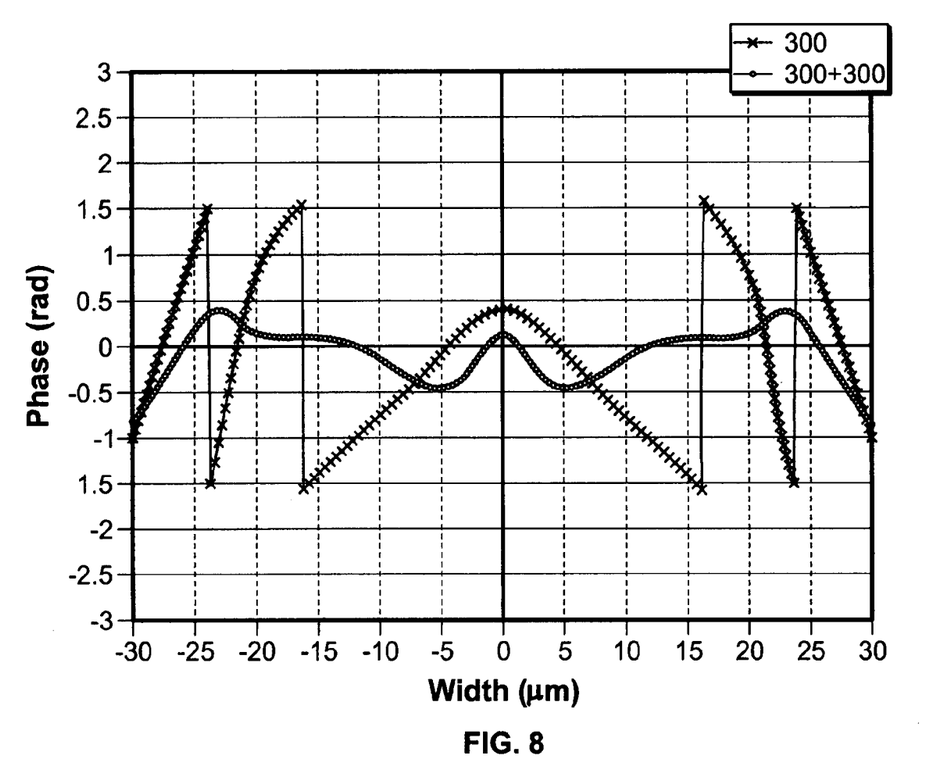
FIG. 8 is a plot comparing the phase variation after a signal has passed through only the first section of the two-section waveguide shown in FIG. 5B with the phase variation after the signal has passed through an AWG with the two-section waveguide of FIG. 5B.

Referring again to FIG. 5B, the second section 30 is straight, and may be rectangular. As shown above in FIG. 5A, the second section 30 produces a Gaussian peak field profile and stabilizes the wave front to reduce the phase variation of the signals output from the first section 20. For example, in FIG. 8, the dark curve shows the phase variation after a signal passes through the first and the second sections 20, 30, and the light curve shows the phase variation after a signal passes through just the first section 20. As shown, the dark curve has much smaller phase variation than the light curve. (Note: Although the light curve looks like there is a discontinuity at 16 nm, 22 nm, −16 nm, and −24 nm, the plot is shown this way to fit within a certain size and the light curve actually continues downward to form an approximately downward parabolic shape.) Smaller phase variation minimizes passband tilting. The width of the input side of the second section 30 usually matches the width of the output end of the first section 20. The length of the second section 30 is determined by simulation to minimize phase variation.

The particular types of input waveguides disclosed herein are exemplary and not limiting. Various structures of tapered first section 20 and straight second section 30 may be implemented to yield the best field and phase transfer between the two sections. Also, depending on the application, the width of the tapered first section 20 could be slightly different from the width of the straight second section 30. A third section having any shape that is slightly different from the straight second section 30 could also be added.

Figure 9A:
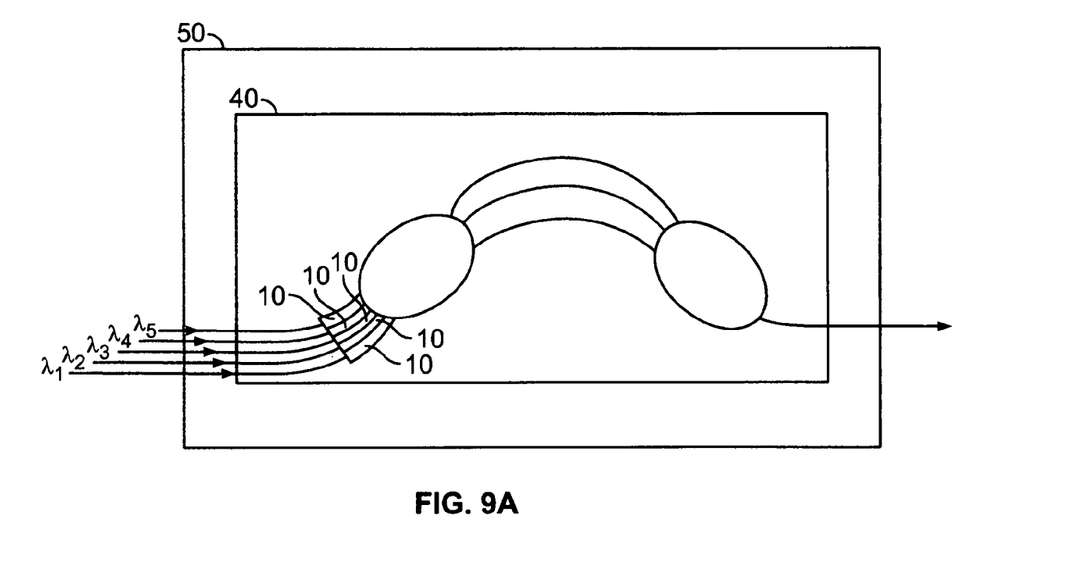
FIGS. 9A and 9B are multiplexing devices in accordance with two embodiments of the invention, respectively.
Figure 9B:
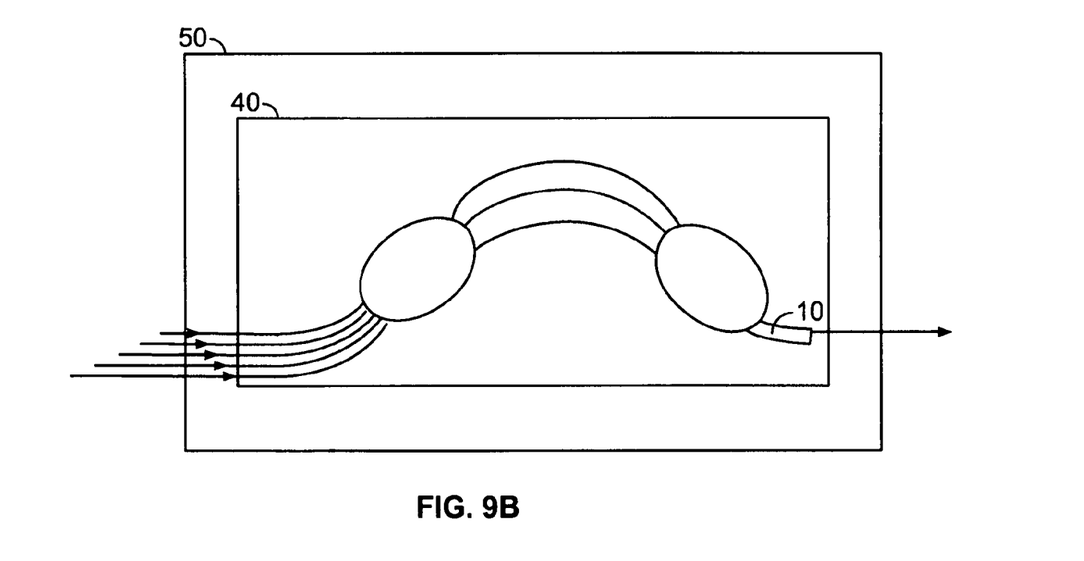

FIGS. 9A and 9B are schematic illustrations of an AWG multiplexer 50 in accordance with different embodiments of the invention. In FIG. 9A, the two-section waveguide 10 is coupled to the input face F1 of the input FPR region 42 so that the input signals $\lambda 1$, $\lambda 2$, $\lambda 3$, $\lambda 4$, and $\lambda 5$ enter the arrayed waveguide grating region 46 after exiting the two-section waveguide 10. In this case, the signals entering the AWG unit 40 already have a flat-top field profile. As shown, each input signal passes through its own two-section waveguide 10. Hence, the number of two-section waveguides 10 that is provided usually matches the number of input signals.

In FIG. 9B, the two-section waveguide 10 is coupled to the output FPR region 44. The input signals $\lambda 1$, $\lambda 2$, $\lambda 3$, $\lambda 4$, and $\lambda 5$ are already multiplexed into a single signal before entering the two-section waveguide 10. The two-section waveguide 10 converts the field profile of the multiplexed signal into a flat-top profile. In the context of a multiplexer with a single output signal, only one two-section waveguide 10 is used for this embodiment.

The spectral passband shape of the signal exiting the AWG multiplexer device 50 has two characteristics that are of interest: 1) the width of the passband at various levels below the transmission maximum, and 2) the ripple (or flatness) of the passband. Both characteristics are related to the shape of the input field. The wider the input field, the wider will be the resultant output spectral shape. However, the wider input field in general is accompanied by a deeper dip between the two peaks of the input field and a deeper dip results in a worse ripple of the output spectral passband. Since the ultra-wide-band AWG requires a very wide input field width, using a parabolic waveguide as the first section 20 may be preferable to using the waveguide splitter method at the input interface. In general, the dip in the input field is usually a lot deeper with the waveguide splitter than with the parabolic waveguide, and possibly leads to a large ripple that is outside the acceptable range. The best choice of waveguide for the first section 20 in terms of type, width, and length depends on the particular application and a person of ordinary skill in the art would understand how to choose the best waveguide for his intended application.

There are a few design considerations in selecting the width of the AWG device 10. As mentioned above, one of these considerations is the separation distance of the peaks, which is related to $\alpha j$ and the figure-of-merit (FOM) of the filter shape. These parameters are defined as follows:

$$\alpha_j = \frac{j\text{-}th \text{ dB Passband}}{CS} \times 100 \text{ (in percentage)} \quad j = 0.5, 1 \text{ or } 3$$

where CS is the channel spacing of an AWG; and $$FOM = \frac{20 \text{ dB Passband}}{1 \text{ dB Passband}}.$$

Table 2 below shows the passband widths corresponding to a channel spacing (CS) of an AWG.

TABLE 2

Comparison of spectral passband widths for different applications

| Passband Shape | AWG Function | $\alpha_{0.5}$ | $\alpha_1$ | $\alpha_3$ | FOM |
|---|---|---|---|---|---|
| Gaussian | Demultiplexer | 10 | 25 | 50 | 4.5 |
| Flat-top | Demultiplexer | 15 | 40 | 60 | ~2 |
| Gaussian | Multiplexer | 18 | 36 | 75 | 4.5 |
| Flat-top | Multiplexer | 36 | 50 | 75 | ~2 |
| Ultra wide Flat-top | Multiplexer | ≧80 | ≧100 | ≧120 | ~2 |

The separation distance between the peaks is related to $\alpha j$ and FOM. Table 2 shows that the $\alpha j$ values of a 50 GHz, 40 G multiplexer that operates with ultra wide flat-top passband are much higher than the $\alpha j$ values of a conventional flat-top filter. Table 3 shows the $\alpha j$ values of two types of ultra-wide flat top passbands.

TABLE 3

Comparison of spectral passband widths for different applications

| Passband Shape | AWG Function | $\alpha_{0.5}$ | $\alpha_1$ | $\alpha_3$ | FOM |
|---|---|---|---|---|---|
| Ultra wide Flat-top type I | Multiplexer | ≧100 | ≧120 | ≧150 | ~2 |
| Ultra wide Flat-top type II | Multiplexer | ≧120 | ≧150 | ≧200 | ~2 |

Figure 10A:
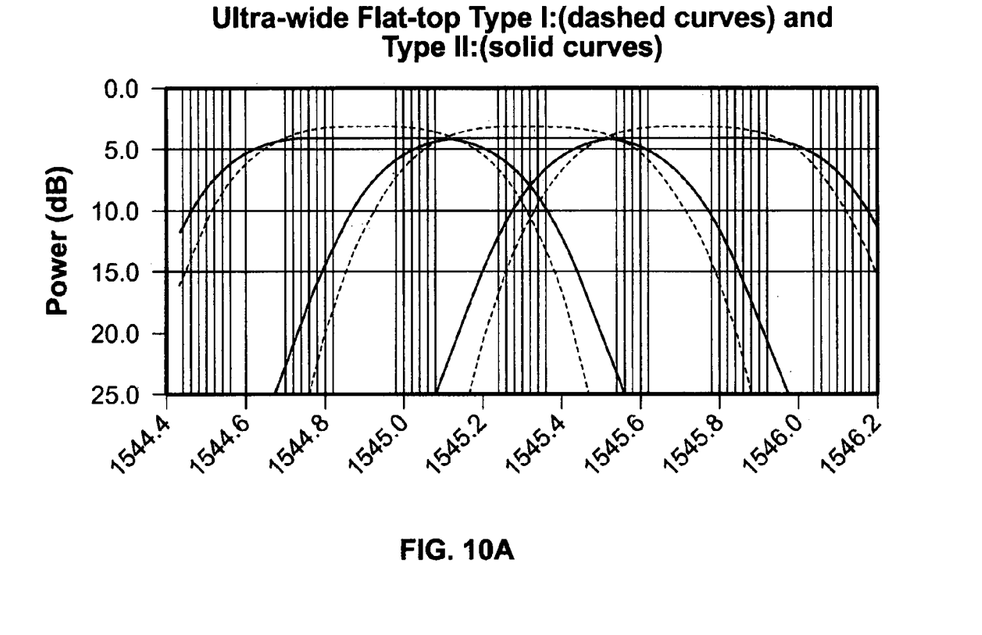
FIGS. 10A, 10B, and 10C show modeling results of two types of ultra-wide flat-top passbands produced with the AWG multiplexer of the invention.
Figure 10B:
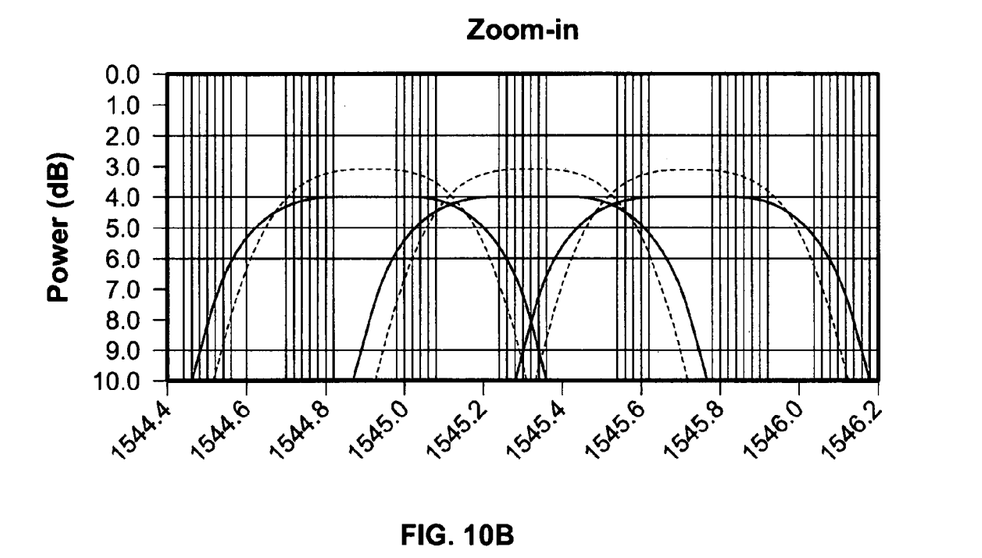
Figure 10C:
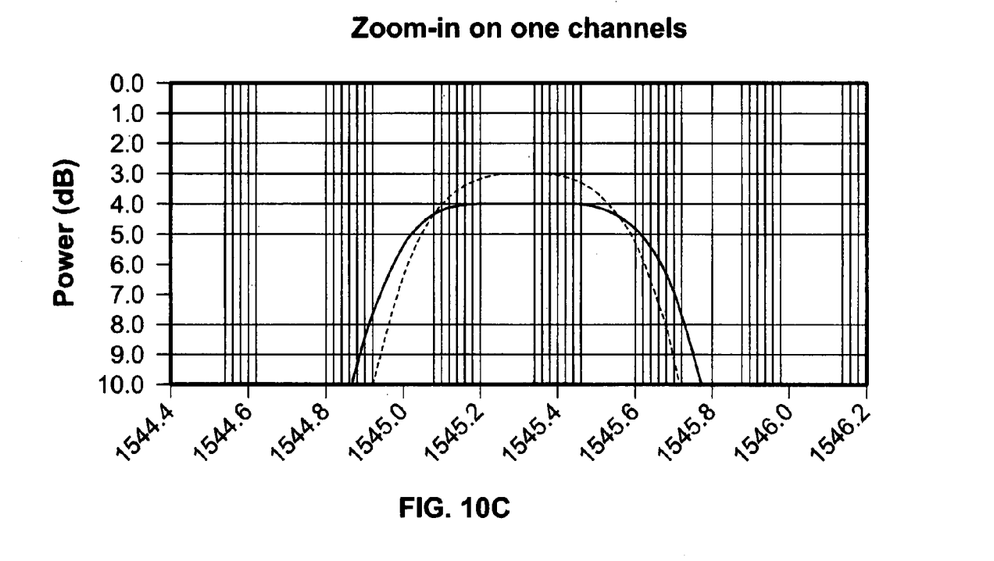
Figure 11:
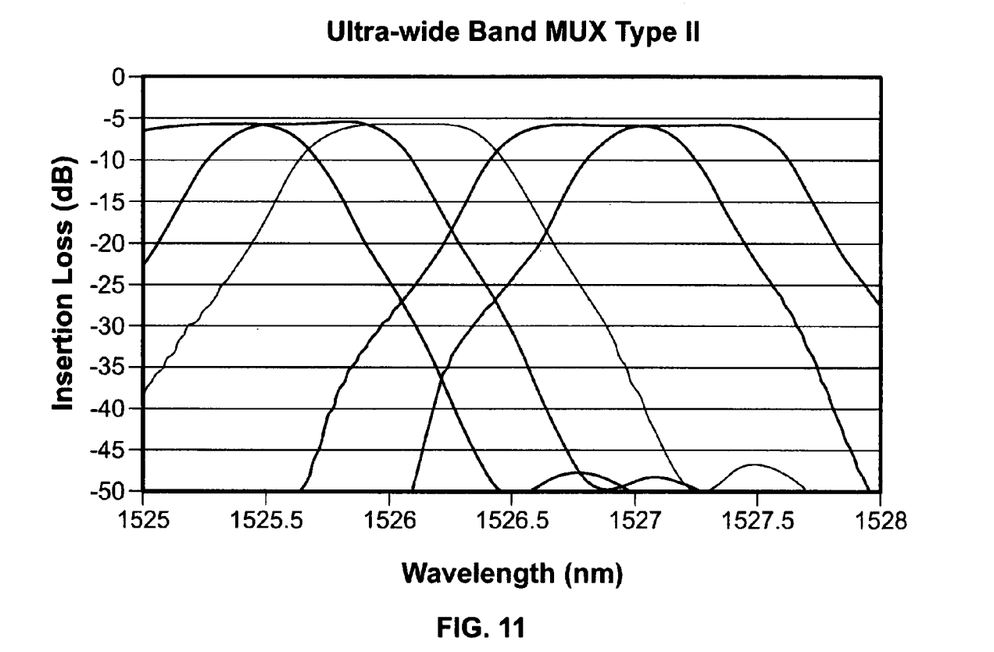
FIG. 11 shows the insertion loss as a function of wavelength for an ultra-wide band multiplexer of the invention.

Modeling results of the two types of ultra-wide flat-top passbands are shown in FIGS. 10A, 10B, and 10C. As shown, the passbands have a wide (ultra-wide) passband shape with flat tops, and Type II is flatter and wider than Type I. FIG. 11 shows the passband shapes of the signals that exit the AWG multiplexer 50 made in accordance with the invention. FIG. 11 shows the experimental measured result of the Type II multiplexer in Table 3, where the structure has been optimized to produce ultra-wide and flat top response without tilting or ripple.

Another design consideration is that the intensity dip between the peaks is related to the flatness of the flat-top curves. It should also be considered that the phase variation is related to the symmetrical spectra from various channels across the wavelength band.

It should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of producing a multiplexed ultra-wide flat-top passband shaped signal, the method comprising:
    passing an input signal through an AWG unit;
    converting the input signal to a signal with a double-peak field profile; and
    generating the multiplexed ultra-wide flat-top passband shaped signal by reducing a phase variation of the signal with the double-peak field profile, wherein the ultra-wide flat-top passband shaped signal has a 0.5-dB width of greater than or equal to 80% of the channel spacing regardless of channel spacing.

2. The method of claim 1, wherein producing the signal with the double-peak field profile comprises passing an input signal through a tapered waveguide for non-adiabatic expansion.

3. The method of claim 2 further comprising selecting the tapered waveguide to produce widest passband shape without the dip between the peaks of the double-peak signal exceeding a preselected depth.

4. The method of claim 3, wherein the preselected depth is about 3 dB.

5. The method of claim 2, wherein the tapered waveguide is a parabolic tapered waveguide.

6. The method of claim 1, wherein producing the signal with the double-peak field profile comprises using a waveguide splitter.

7. The method of claim 1, wherein the converting of the input signal to the signal with a double-peak field profile is done before passing the input signal through the AWG unit.

8. The method of claim 1, wherein the converting of the input signal to the signal with a double-peak field profile is done after passing the input signal through the AWG unit.

9. The method of claim 1, wherein the ultra-wide flat-top passband shaped signal has a 0.5-dB passband width of about 0.4 nm in a 50 GHz channel spaced system where channels are 0.4 nm apart.

10. The method of claim 1, wherein the ultra-wide flat-top passband shaped signal has a 1.0-dB passband width of about 0.5 nm in a 50 GHz channel spaced system where channels are 0.4 nm apart.

11. The method of claim 1, wherein the ultra-wide flat-top passband shaped signal has a 3.0-dB passband width of about 0.6 nm in a 50 GHz channel spaced system where channels are 0.4 nm apart.

12. The method of claim 1, wherein the ultra-wide flat-top passband shaped signal has a 1.0-dB width of greater than or equal to 100% of the channel spacing regardless of the size of channel spacing.

13. The method of claim 1, wherein the ultra-wide flat-top passband shaped signal has a 3.0-dB passband width of greater than or equal to 120% of the channel spacing regardless of size of channel spacing.

14. The method of claim 1, wherein the ultra-wide flat-top passband shaped signal has a 0.5-dB width of greater than 120% of the channel spacings regardless of the size of channel spacing.

15. The method of claim 1, wherein the ultra-wide flat-top passband shaped signal has a 1.0-dB width of greater than 150% regardless of size of channel spacing.

16. The method of claim 1, wherein the ultra-wide flat-top passband shaped signal has a 3.0-dB passband width of greater than or equal to 200% regardless of size of channel spacing.

17. The method of claim 1, wherein reducing the phase variation comprises passing the signal with the double-peak field profile through a straight waveguide having a length of about 300 μm.

18. A method of producing an ultra-wide flat-top passband shaped signal, the method comprising:
    passing a plurality of input signals through an AWG unit;
    separately converting each of the input signals to a double-peak signal; and
    separately changing a phase variation of each double-peak signal to generate the ultra-wide flat-top passband shaped signal, wherein the ultra-wide flat-top passband shaped signal has a 0.5-dB width of greater than or equal to 80% of the channel spacing regardless of channel spacing.

* * * * *